United States Patent [19]

Schulz

[11] Patent Number: 4,483,478

[45] Date of Patent: Nov. 20, 1984

[54] METHOD FOR FABRICATING SUPERPLASTICALLY FORMED/DIFFUSION BONDED ALUMINUM OR ALUMINUM ALLOY STRUCTURES

[75] Inventor: David W. Schulz, Hermosa Beach, Calif.

[73] Assignee: Rockwell International Corporation, El Segundo, Calif.

[21] Appl. No.: 301,360

[22] Filed: Sep. 11, 1981

[51] Int. Cl.$^3$ .................................................. B23K 31/02
[52] U.S. Cl. .................................... 228/157; 228/265; 228/193; 228/205
[58] Field of Search ............... 228/206, 205, 193, 118, 228/157, 263 F, 265; 204/192 E

[56] References Cited

U.S. PATENT DOCUMENTS

| | | |
|---|---|---|
| 1,196,118 | 8/1916 | Klauber . |
| 3,500,532 | 8/1980 | Lozano et al. .................. 29/470 |
| 3,927,817 | 12/1975 | Hamilton et al. ................ 228/157 |
| 3,937,387 | 2/1976 | Fletcher et al. .................. 228/193 |
| 4,070,264 | 1/1978 | Loiseau et al. ................. 204/192 E |
| 4,087,037 | 5/1978 | Schier et al. ................... 228/157 X |
| 4,113,486 | 9/1978 | Sato ........................... 204/192 E X |
| 4,148,705 | 4/1979 | Battey et al. ................... 204/192 E |
| 4,220,276 | 9/1980 | Weisert et al. .................. 228/118 |
| 4,222,838 | 9/1980 | Bhagat et al. .................. 204/192 E |
| 4,307,179 | 12/1981 | Chang et al. ................. 204/192 E X |
| 4,348,577 | 9/1982 | Joyoda et al. ................. 204/192 E X |
| 4,349,409 | 9/1982 | Shiboyama et al. ......... 204/192 E X |
| 4,361,262 | 11/1982 | Israeli ......................... 228/157 X |
| 4,373,990 | 2/1983 | Porter ....................... 204/192 E X |

OTHER PUBLICATIONS

N. E. Paton, "Interdisciplinary Program for Quantitative Flaw Definition, Special Report, Second Year Effort", for period of 7/1/75-4/30/76, pp. 96, 100 and 101.

Primary Examiner—Kuang Y. Lin
Assistant Examiner—M. Jordan
Attorney, Agent, or Firm—Charles T. Silberberg; Max Geldin

[57] ABSTRACT

A method for fabricating superplastically formed/diffusion bonded structures wherein metal blanks of aluminum or an aluminum alloy having an oxide surface layer are joined at selected areas by diffusion bonding and expanded superplastically to form a desired sandwich or integrally stiffened structure. According to such method, a suitable mask is applied to selected areas of the aluminum or aluminum alloy blanks. The assembly is then placed in a vacuum chamber and at a suitable low pressure and suitable voltage a glow discharge is created between the metal blank or blanks functioning as cathode or sputtering target, and an anode to selectively remove the oxide from the metal blanks and deposit the oxide debris on the anode. After the oxide layers have been removed from the surfaces of the blanks to be bonded, such surfaces are brought into intimate contact within the sputtering chamber or in an area equipped with heated platens, and while preventing reoxidation of the cleaned surface areas of the metal blanks, such blanks are subjected to press pressure and heat. The cleaned oxide-free areas bond, while the remaining areas, protected by the natural oxide and covered by the masks, do not bond. Such masks can be removed after sputtering and either prior to or during die bonding. If desired, the aluminum or aluminum alloy blanks can be initially anodized, to provide a thicker bond resistant oxide layer. The die bonded metal blanks are then subjected to superplastic forming in known manner to fabricate an integrally stiffened or sandwich structure.

25 Claims, 5 Drawing Figures

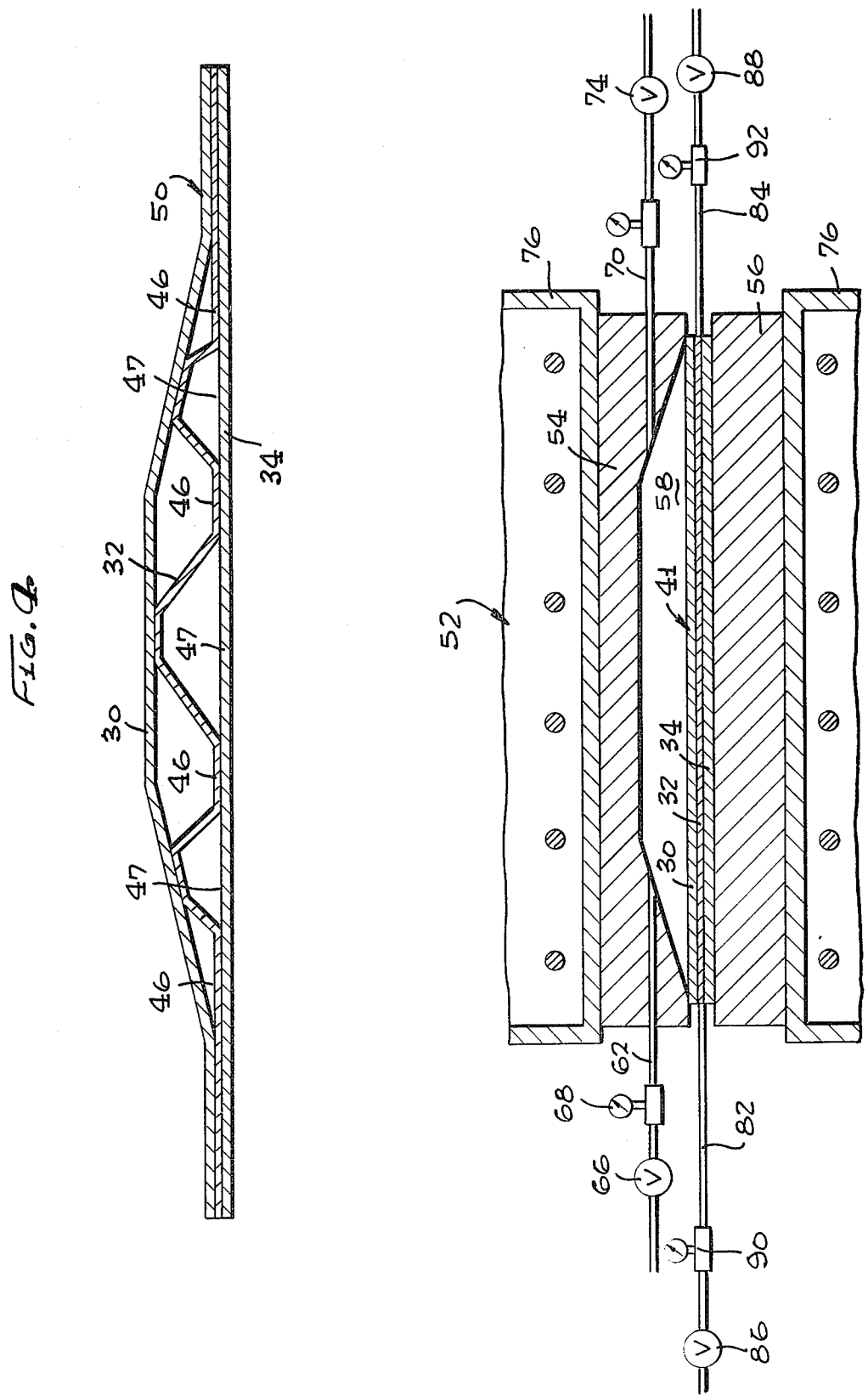

4,483,478

METHOD FOR FABRICATING SUPERPLASTICALLY FORMED/DIFFUSION BONDED ALUMINUM OR ALUMINUM ALLOY STRUCTURES

BACKGROUND OF THE INVENTION

This invention relates to the fabrication of metallic sandwich and integrally stiffened structures formed particularly from aluminum or its alloys, and is particularly directed to a method of making such structures by superplastic forming and diffusion bonding (SPF/DB), employing improved procedure for removing surface oxides of the aluminum or aluminum alloy metal blanks in selective areas to permit diffusion bonding of the resulting clean aluminum or aluminum oxide blanks in such selected areas.

Structures have been successfully produced from a number of titanium-based alloys by the Superplastic Forming/Diffusion Bonding (SPF/DB) process. Such structures are producible because many titanium alloys exhibit the two essential physical properties required for SPF/DB, namely ability to be diffusion bonded and superplasticity. Other alloy systems, such as aluminum and aluminum-based alloys, also have these properties, but have not been successfully applied to the SPF/DB process because of the difficulty in eliminating surface oxides, which inhibits diffusion, thereby preventing successful diffusion bonding. Titanium is unique in that it can dissolve its own oxide, within the SPF/DB operating temperature, and therefore allows diffusion to proceed uninhibited, whereas there is only limited solubility of oxygen in metals such as aluminum and its alloys.

Diffusion bonding refers to the solid-state, metallurgical joining of surfaces of similar or dissimilar metals by applying heat and pressure for a time duration so as to effect intimate surface contact and cause comingling of atoms at the joint interface.

After the bonds between adjacent metal blanks are formed during diffusion bonding, inert gas pressure, such as argon or helium, is applied to the interior network to superplastically form the unbonded portions of the adjacent metal sheets.

U.S. Pat. Nos. 3,927,817 and 4,220,276 are illustrative of processes for fabricating superplastically formed/diffusion bonded structures, employing metal blanks of a titanium alloy.

U.S. Pat. No. 3,500,532 discloses employing an arc in a reducing atmosphere, for the purpose of cleaning metal surface areas of various metals, followed by cold welding the metal surfaces together.

It is known to clean metals, including aluminum with mercury to remove oxide, prior to welding, as disclosed in U.S. Pat. No. 1,196,118.

Rockwell International Report: "Interdisciplinary Program for Quantitative Flaw Definition Special Report Second Year Effort," for period of July 1, 1975 to June 30, 1976, Contract No. F33615-74-C5180, Page 100, discloses fabrication of ultrasonic test standards by a process including removal of the oxide from the entire surface of aluminum sheets D.C. sputtering the surface of the aluminum prior to bonding in an ultra high vacuum system. However, there is no disclosure in the article as to the details of the D.C. sputtering procedure employed therein. The clean surfaces of such aluminum specimens are brought into contact without removing these aluminum specimens from the vacuum, the bondline heated and a force applied sufficient to bring about diffusion bonding of such specimens. However, it was noted that the quality of the bonds so produced had not been proven satisfactory, and that the arrangement was too complex to be used in the actual production of parts from aluminum. Thus, such diffusion bonding of the so-treated aluminum specimens was never apparently successfully tested and it was concluded that the process would not be suitable for production of diffusion bonded aluminum parts. Further, such sputtering procedure was used only for ultrasonic test standards for flaw definition and was not utilized for diffusion bonding of aluminum parts in preselected areas only, and particularly in combination with superplastic forming.

It is an object of the present invention to provide an improved procedure for producing SPF/DB structures.

Another object of the invention is the provision of a superplastic forming and diffusion bonding procedure particularly for aluminum or aluminum alloy blanks or sheets which provide for uniform rapid removal of surface oxides from the metal blanks to permit effective diffusion bonding of the metal blanks.

A still further object is the provision in the above noted superplastic forming and diffusion bonding process of improved procedure for effective diffusion bonding of aluminum alloy metal blanks or sheets by removal of surface oxides from preselected areas to premit diffusion bonding in such areas while utilizing the initial oxide in other preselected locations to prevent diffusion bonding.

SUMMARY OF THE INVENTION

An essential feature of the present invention for use in the combined superplastic forming/diffusion bonding process, employing metal, preferably aluminum or aluminum alloy, pieces or blanks, is the application of sputtering under controlled vacuum conditions to remove an oxide layer from selected areas of such blanks, and prevent the oxide debris so removed from recontaminating or reoxidizing the surfaces to be diffusion bonded, while utilizing the remaining surface oxides to prevent bonding in other preselected locations.

According to the invention process, a mask or coating and which can be an organic coating, is applied to selected areas of the aluminum or aluminum alloy blanks, leaving exposed the areas where diffusion bonding is to take place.

The sheets are then placed in a vacuum chamber containing suitable equipment and under a controlled vacuum, a cold cathode glow discharge condition is created, the sheets constituting cathodes, and in effect, sputtering targets. "Sputtering" is a term employed for mechanically tearing molecules such as oxides from a cathodically charged surface, the target, and transferring them to an anodic surface where they are deposited as an adherent coating. Sputtering is accomplished either by direct current (D.C.) or radio frequency (RF). The latter is much more effective in the controlled removal of oxides and provides the least amount of reoxidation of the freshly cleaned surface, and hence is the preferred mode according to the invention. It is noted that the sputtering method described in the above "Flaw Definition" article was the D.C. method which is not believed to have prevented reoxidation of the cathodic surface. The coating or mask prevents removal of oxide in those selected areas covered by such mask while the other uncovered selected areas are "sputtered" away.

After the oxide layers have been removed from the surfaces to be bonded, these surfaces are brought into contact within the sputtering chamber at a partial pressure which is further reduced to prevent reoxidation of the freshly cleaned aluminum or aluminum alloy surfaces. Bonding pressure within such chamber can be applied by any suitable means such as by means of an inert gas, or by means of rollers or hard platens, and the platens heated by radiation or other methods within the vacuum chamber e.g. to about 960° F., to effect diffusion bonding of the sheets. The cleaned areas bond, while the remaining areas, protected by the natural oxide, do not bond.

The mask or coating from the selected covered areas which do not bond is removed after sputtering, and either prior to or during the diffusion bonding operation.

The so-bonded pack or arrangement containing unbonded oxide areas in selected locations is then subjected to superplastic forming e.g. at about 960° F., at such oxide areas either in the vacuum chamber or in a separate SPF/DB tool.

It is noted that after diffusion bonding, the pack may be removed and handled in air without having the bonds affected.

According to an alternative feature, the aluminum or aluminum alloy sheets can be initially anodized to provide a thicker oxide layer in those areas which are not sputtered away and which are not subjected to diffusion bonding.

BRIEF DESCRIPTION OF THE DRAWINGS

The invention will be more readily understood by reference to the detailed description below of certain preferred embodiments taken in connection with the accompanying drawings wherein:

FIG. 4 illustrates production of a sandwich structure produced by superplastic forming of the diffusion bonded arrangement of FIG. 3; and FIG. 5 is a cross section illustrating an apparatus for carrying out both diffusion bonding and superplastic forming of the arrangement of FIG. 2.

DETAILED DESCRIPTION OF THE INVENTION

The present invention comprises a sputtering technique, preferably an RF system, to physically remove an oxide layer from selected areas of a metallic surface under controlled conditions and maintain such areas of the surface free from reoxidation until diffusion bonding of the surfaces of the metal sheets at those areas from which oxide layer has been removed. Although the present procedure is primarily adapted for alloys which do not dissolve their oxide, such as INCO 718 and aluminum and aluminum alloys, it is also applicable to titanium alloys. By removing the oxide layer from such surfaces, rather than allowing the oxides to dissolve, diffusion bonding times can be substantially reduced.

Figure 1:
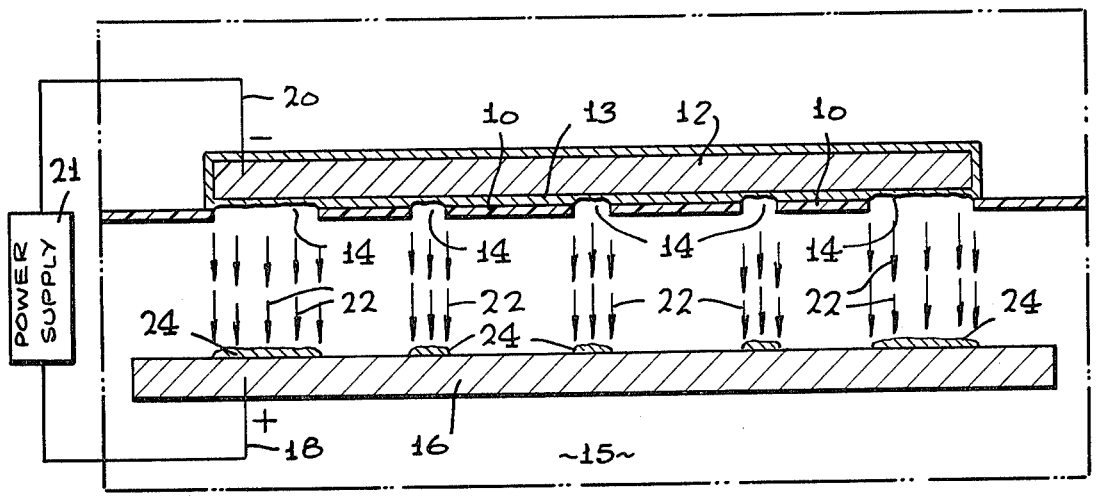
FIG. 1 is a generally schematic illustration of the sputtering mechanism for removal of oxide from the surface of aluminum or aluminum alloy blanks prior to diffusion bonding.

In carrying out the procedure for removal of the oxides from certain areas 14 of the aluminum alloy surfaces, a mask indicated at 10 in FIG. 1 is applied to other preselected areas 13 of an aluminum or aluminum alloy sheet 12, which preselected areas are not to be diffusion bonded. The mask can be in the form of a paint or coating, e.g., an organic coating such as "paraline", understood to be organic polyarylene materials, particularly related to poly (paraxylylene). Other organic polymers such as Lexam, a polycarbonate resin, and acrylics also can be used. The exposed areas 14 are the areas from which oxides are to be removed.

The sheet 12 is placed in a vacuum chamber 15 containing suitable equipment to create a cold cathode glow discharge condition. Such equipment comprises an electrode or anode 16, such as a Mo anode, which is spaced from the aluminum sheet on target 12, which constitutes the cathode. Electrical connections 18 and 20 from a RF power source 21, are connected to the anode 16 and to the aluminum or aluminum alloy sheet cathode 12.

According to a feature of the present invention, the oxides from areas 14 are sputtered away, as indicated by the arrows 22 in FIG. 1 by RF sputtering, as noted above, and are transferred and deposited as oxides debris at 24 on the surfaces of the anode, by electrostatic force. The oxide surfaces 13 covered by the mask 10 remain unaffected. Such sputtering is generally carried out at a partial pressure of about $10^{-3}$ to about $10^{-1}$ Torr in the presence of an inert gas such as argon, and at a differential potential.

After the oxide layer has been removed from the surfaces of the aluminum or aluminum alloy sheet 12 as described above, since the freshly cleaned sheets 12 cannot be exposed to air after the oxide layer is removed, the surfaces of two or more similarly treated sheets from which oxides have been removed as described above are brought into contact with each other preferably within the sputtering chamber, either at the partial pressure of argon in the chamber or at a further reduced pressure e.g., of $10^{-6}$ Torr.

The sputtering equipment in vacuum chamber 15 can be arranged so that two or more aluminum or aluminum alloy sheets such as 12 can be sputtered simultaneously, for example by having two aluminum or aluminum alloy sheets functioning as cathodes on opposite sides of the anode 16, and the anode 16 can be arranged to be swung away, or removed from the chamber following sputtering.

Diffusion bonding between two or more sheets 12 can be accomplished by heating the sheet assembly within chamber 15 to a suitable diffusion bonding temperature of about 960° F., and at bonding pressure ranging from about 100 psi to about 2000 psi or more, by the application of rollers, hard platens or by gas pressure, as described below. The cleaned areas 14 of adjacent aluminum or aluminum alloy sheets 12 bond together, while the remaining areas 13 containing surface oxides and protected by the mask 10, do not bond. The mask 10, formed of organic polymer, can be removed by volatilization during diffusion bonding, or vaporized prior to diffusion bonding, e.g., by initial heating to a suitable temperature, e.g. about 300°–400° F. in the case of acrylic resin.

After diffusion bonding of two or more sheets of aluminum or aluminum alloy 12, as described above, the resulting bonded pack is then subjected to superplastic forming in the conventional manner. Once diffusion bonding has been accomplished, reoxidation is no longer a concern. This is accomplished by placing the diffusion bonded sheets 12 in a forming apparatus, e.g. having an upper and lower tool. One or more of such tools can contain a plurality of die cavities, and passages are provided for introducing gas into the assembly between the diffusion bonded sheets. The bonded pack then is superplastically formed under suitable temperature and pressure conditions, such as 960° F. and 100 to 2,000 psi, by stretching of one of the sheets such as the lower sheet at the unbonded areas previously covered by the masks 10 into contact with the surface of the tool to form the expanded portion of the assembly, as described below.

The superplastic forming and diffusion bonding operation, and the apparatus for carrying out such procedure, are described in detail in above U.S. Pat. No. 3,927,817. Such disclosure is incorporated herein by reference. An apparatus of this type is described below in connection with FIG. 5.

Figure 2:
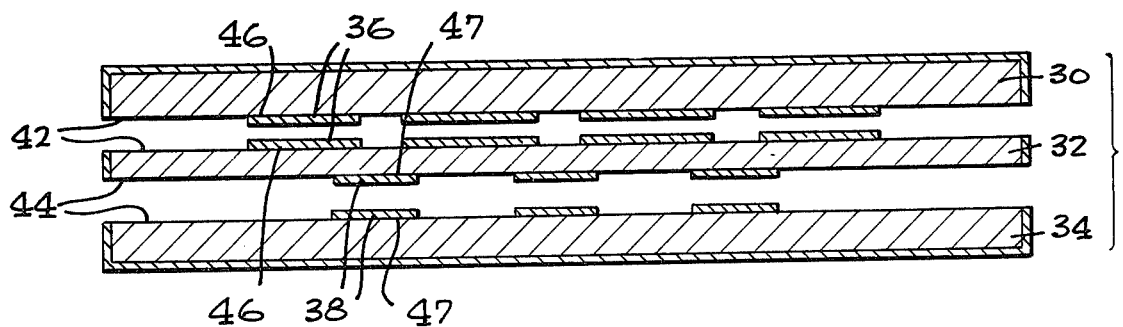
FIG. 2 illustrates as arrangement of three sheets treated according to the invention process.

FIG. 2 of the drawing shows an arrangement of three sheets, an upper face sheet 30, a core sheet 32, and a lower face sheet 34 of aluminum alloy previously treated according to the invention process for removal or cleaning of surface oxides by sputtering from all of those areas 42 not protected by masks, indicated at 36, on the lower surface of the upper face sheet 30 and the upper surface of the core sheet 32, and from all of those areas 44 not protected by masks, indicated at 38, on the lower surface of the core sheet 32 and the upper surface of the lower face sheet 34. The three sheets are placed in registry so that the surface oxide areas 46 covered by masks 36 of upper face sheet 30 and the core sheet 32 are in vertical alignment, and the surface oxide areas 47 covered by masks 38 of the core sheet 32 and lower face sheet 34 are in vertical alignment.

Figure 3:
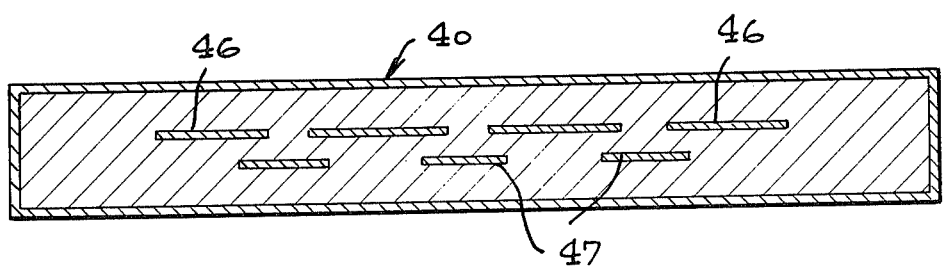
FIG. 3 illustrates the three sheets of FIG. 2 diffusion bonded together.

Following diffusion bonding of the three sheets 30, 32 and 34, as illustrated in FIG. 3, a monolithic sheet 40 is formed with the preselected cleaned surfaces 42 of sheets 30 and 32 bonded together and the preselected cleaned surfaces 44 of sheets 32 and 34 bonded together, and containing the selected non-bonded surface oxide areas 46 between sheets 30 and 32, and the selected surface oxide non-bonded areas 47 between sheets 32 and 34, previously covered by masks 36 and 38.

FIG. 4 illustrates in cross section, production of a sandwich structure 50 produced by superplastic forming of the diffusion bonded monolithic structure 40 shown in FIG. 3. In producing such sandwich structure during superplastic forming, it will be seen that stretching of the upper face sheet 30 away from the core sheet 32 occurred at the surface oxide covered unbonded areas 46 between such two sheets, and that stretching of the core sheet 32 with respect to the lower face sheet occurred at the surface oxide covered unbonded areas 47 between the two sheets, to form the truss 32 between the upper and lower face sheets 30 and 34 of the sandwich structure 50.

Now referring to FIG. 5, there is shown an apparatus 52 which can be employed for carrying out the diffusion bonding and the superplastic forming of the three sheets 30, 32 and 34. Such apparatus can be incorporated in the vacuum chamber 15 of FIG. 1. The apparatus is comprised of an upper tooling frame 54 and a lower tooling frame 56, the upper tooling member 54 being a shaping member for the configuration of the upper face sheet 30 of the sandwich structure to be formed, and illustrated in FIG. 4. The stack of sheets 30, 32 and 34, indicated at 41, all of which have been previously treated for removal of surface oxides in preselected areas by sputtering according to the invention, while retaining surface oxides in other preselected areas, as illustrated in FIG. 2, is supported on the lower tooling frame 56 beneath the chamber 58.

Line 62 is connected to a source of pressurized inert gas at one end (not shown) and to chamber 58, including a valve 66 for governing the flow of inert gas through line 62 into chamber 58 and a pressure gauge 68 to indicate pressure provided. The inert gas usually employed preferably in argon in liquid form. An additional line 70 is optionally provided on the opposite side of tooling frame 54 and functions as an outlet for inert gas in chamber 58. Line 70 has a valve 74 therein for regulation of inert gas flow from chamber 58. Line 70 can simply function as a vent or can be connected to a source of vacuum, such as a suction pump (not shown).

When the stack of sheets 30, 32 and 34, indicated at 41, is placed in forming apparatus 52, the stack can be heated in an inert gas atmosphere to a suitable diffusion bonding temperature for the aluminum alloy, e.g. 960° F., by heat generated from heating platens 76 and then applying pressure to the stack 41 by increasing the pressure in chamber 58 by adding additional pressurized inert gas through line 62 while maintaining line 70 closed by valve 74. In this manner the cleaned oxide-free areas 42 and 44 of the stack 41 will be diffusion bonded by the application of such pressure, e.g. of approximately 500 psi, for a suitable period depending upon the thickness of the stack of sheets 41, to the monolithic sheet 40 illustrated in FIG. 3.

For expansion and superplastic forming of the stack 41 to the configuration shown in FIG. 4, expansion tubes 82 and 84, having valves 86 and 88, and pressure gauges 90 and 92, respectively, are provided which communicate with channels and recesses (not shown) between the three sheets 30, 32 and 34 of the stack 41, so that inert gas will flow fairly evenly between the aluminum alloy sheets.

Before superplastic forming or expanding of the stack 41 of aluminum alloy sheets, the pressure in chamber 58 is reduced through lines 62 and 70. At superplastic forming temperature e.g. of about 960° F., the diffusion bonded stack 41, is expanded into the shape of the sandwich structure shown in FIG. 4 by flowing pressurized inert gas through lines 82 and 84 while optimally applying a vacuum to chamber 58 through lines 62 and 70. The pressurized inert gas flows from tubes 82 and 84 into the channels and spaces (not shown) between the adjacent sheets of the diffusion bonded stack 41, and such pressurized inert gas within the stack 41 forces the expansion of sheets 30 and 32 at the unbonded areas 46 and 47, into the sandwich structure shape shown in FIG. 4, within the forming chamber 58.

From the foregoing, it is seen that the invention provides an efficient process for the superplastic forming and diffusion bonding of aluminum or aluminum alloy sheets, by selective removal of oxide from the aluminum sheets by a sputtering operator under controlled vacuum conditions while retaining surface oxide in other selected areas to prevent bonding at such locations. It has been found in such sputtering operations that removal of oxides from selected areas is particularly effective when the zone wherein sputtering occurs is in a preferred partial pressure range, as noted above. In the present process, initial anodizing of the entire surface of the aluminum sheets can be beneficial in further aiding to prevent bonding at the preselected locations where oxides are retained. Such anodizing for the production of additional oxide layer on the aluminum or aluminum sheets can be carried out in any well-known anodizing process, as by passage of a high voltage electric current through a bath in which the aluminum or aluminum alloy sheets are suspended, such bath usually containing sulphuric, chromic or oxalic acid.

The sputtering technique of the invention is particularly advantageous because it can selectively remove layers of oxides and remove the oxide debris simultaneously from the cleaning environment. Other cleaning techniques such as abraiding, chemical etching or dissolving the oxide by the use of fluxes, if carried out in a vacuum or partial pressure of argon, to preserve the cleaned oxide surface, presents problems in controlling the removal of oxides from the work, etching solutions or the process chamber.

There is thus provided according to the invention a combined SPF/DB process including the steps of removal of oxide from selected areas by sputtering in a vacuum chamber within a preferred pressure range, while the oxide in other areas is protected to prevent diffusion bonding in such areas, and while still under reduced pressure to prevent reoxidation in such selected areas, subjecting such oxide cleaned surfaces of two or more aluminum sheets to diffusion bonding, followed by superplastic forming of such diffusion bonded sheets to form integrally and expanded, bonded, e.g. sandwich, structures.

Since various changes and modifications of the invention will occur to and can be made readily by those skilled in the art without departing from the invention concept, the invention is not to be taken as limited except by the scope of the appended claims.

I claim:

1. A process for diffusion bonding and superplastic forming of metal workpieces containing surface oxides, which comprises applying a mask over selected areas of said workpieces, and leaving other preselected areas uncovered, subjecting one or more of said workpieces to sputtering in a zone of reduced pressure in an inert gas atmosphere employing said workpieces as cathodes, and applying a differential potential between an anode and one or more of said cathodes sufficient to create a cold cathode glow discharge and causing the oxides of said uncovered preselected areas to be sputtered away and transferred electrostatically to the surfaces of said anode, and to form cleaned surfaces in said preselected areas, without affecting the oxides over said selected areas covered by said mask, placing said workpieces in contact with each other in a stack without reoxidizing said cleaned surfaces, and diffusion bonding said workpieces under heat and pressure at said preselected areas from which oxides were removed, without bonding said selected areas from which oxides were not removed, and superplastically forming at least one of said workpieces by applying fluid pressure within the unbonded areas of said stack while said stack is within a temperature range at which said at least one workpiece exhibits superplastic characteristics.

2. The process as defined in claim 1, wherein said metal is aluminum or an aluminum alloy.

3. The process as defined in claim 1, wherein said mask is comprised of an organic polymer, and said mask is removed after sputtering and before diffusion bonding.

4. The process as defined in claim 1, wherein said sputtering is carried out in a vacuum chamber, and following sputtering and without reoxidizing the preselected areas from which the oxides were removed, carrying out said diffusion bonding by positive compressive pressure on said stack while said stack remains in said vacuum chamber.

5. The process as defined in claim 1, wherein said sputtering is RF sputtering.

6. The process as defined in claim 1, wherein said reduced pressure is in a range from about $10^{-3}$ to about $10^{-1}$ torr.

7. The process as defined in claim 6, wherein said sputtering is RF sputtering.

8. The process as defined in claim 7, wherein said mask is comprised of an organic polymer, and said mask is removed after sputtering and before diffusion bonding.

9. The process as defined in claim 1, wherein said mask is comprised of an organic polymer, and said mask is removed during diffusion bonding.

10. The method as defined in claim 9, wherein said mask is removed by heat during diffusion bonding.

11. The process as defined in claim 7, wherein said mask is comprised of an organic polymer, and said mask is removed during diffusion bonding.

12. The process for making an integrally bonded and expanded structure formed of at least two metal workpieces containing surface oxides including the steps of treating said workpieces at selected areas to prevent bonding at said selected areas, removing surface oxides from other preselected areas of said workpieces to permit diffusion bonding at said other preselected areas, placing said at least two workpieces into contact with each other in a stack under conditions of temperature and pressure to produce diffusion bonding of said workpieces at said preselected areas, and superplastically forming at least one of said workpieces by applying fluid pressure within the unbonded areas of said stack while said stack is within a temperature range at which said at least one workpiece exhibits superplastic characteristics; wherein said removing step comprises removing said surface oxides from said other preselected areas of said workpieces by sputtering away said oxide in a vacuum zone in the presence of an inert gas without affecting the surface oxides in said selected areas, and carrying out said diffusion bonding at said preselected areas without reoxidizing the surfaces of said preselected areas.

13. The process as defined in claim 12, wherein said metal is aluminum or an aluminum alloy.

14. The process as defined in claims 12 or 13, wherein said sputtering is carried out in said vacuum zone at a partial pressure of an inert gas, ranging from about $10^{-3}$ to about $10^{-1}$ torr.

15. The process as defined in claim 14, wherein said vacuum zone is an enclosed vacuum chamber containing sputtering equipment including an anode, said workpiece or workpieces in said vacuum chamber constituting cathodes, and wherein said oxides are sputtered away from said cathodes and deposited as an adherent oxide coating on said anode, and including a power source, and electrical connections between said power source, said cathodes and said anode.

16. The process as defined in claims 12 or 13, said treating said workpieces at said selected areas to prevent bonding at said selected areas, comprising applying a mask to said selected areas prior to sputtering, and removing said mask after sputtering.

17. The process as defined in claim 16, and wherein said mask is removed before said diffusion bonding.

18. The process as defined in claims 12 or 13, said diffusion bonding being carried out in said vacuum zone while said zone is maintained at a pressure corresponding to the pressure in said vacuum zone during sputtering.

19. The process as defined in claims 12 or 13, said sputtering being RF sputtering.

20. The process as defined in claim 16, and wherein said mask is removed during said diffusion bonding.

21. The process as defined in claims 12 or 13, said diffusion bonding being carried out in said vacuum zone while said zone is maintained at a still further reduced pressure than the pressure corresponding to the pressure in said vacuum zone during sputtering.

22. A process for diffusion bonding and superplastic forming of metal workpieces containing surface oxides, which comprises
   anodizing said workpieces to provide a thicker oxide layer on the surface of said workpieces,
   applying a mask over selected areas of said workpieces, and leaving other preselected areas uncovered,
   subjecting one or more of said workpieces to sputtering in a zone of reduced pressure in an inert gas atmosphere employing said workpiece as cathodes, and applying a differential potential between an anode and one or more of said cathodes sufficient to create a cold cathode glow discharge and causing the oxides of said uncovered, preselected areas to be sputtered away and transferred electrostatically to the surfaces of said anode, and to form cleaned surfaces in said preselected areas, without affecting the oxides over said selected areas covered by said mask,
   placing said workpieces in contact with each other in a stack without reoxidizing said cleaned surfaces,
   diffusion bonding said workpieces under heat and pressure at said preselected areas from which oxides were removed, without bonding said selected areas from which oxides were not removed, and
   superplastically forming at least one of said workpieces by applying fluid pressure within the unbonded area of said stack while said stack is within a temperature range at which said at least one workpiece exhibits superplastic characteristics.

23. A process for diffusion bonding and superplastic forming of metal workpieces containing surface oxides, which comprises
   anodizing said workpieces to provide a thicker oxide layer on the surface of said workpieces,
   applying a mask comprised of an organic polymer over selected areas of said workpieces, and leaving other preselected areas uncovered,
   subjecting one or more of said workpieces to RF sputtering in a zone of reduced pressure in a range from about $10^{-3}$ to $10^{-1}$ torr in an inert gas atmosphere employing said workpiece as cathodes, and applying a differential potential between an anode and one or more of said cathodes sufficient to create a cold cathode glow discharge and causing the oxides of said uncovered, preselected areas to be sputtered away and transferred electrostatically to the surfaces of said anode, and to form cleaned surfaces in said preselected areas, without affecting the oxides over said selected areas covered by said mask,
   placing said workpieces in contact with each other in a stack without reoxidizing said cleaned surfaces,
   removing said mask,
   diffusion bonding said workpieces under heat and pressure at said preselected areas from which oxides were removed, without bonding said selected areas from which oxides were not removed, and
   superplastically forming at least one of said workpieces by applying fluid pressure within the unbonded area of said stack while said stack is within a temperature range at which said at least one workpiece exhibits superplastic characteristics.

24. The process as defined in claim 23, wherein said metal is aluminum or an aluminum alloy.

25. A process for diffusion bonding and superplastic forming of metal workpieces containing surface oxides, which comprises
   anodizing said workpieces to provide a thicker oxide layer on the surface of said workpieces,
   applying a mask comprised of an organic polymer over selected areas of said workpieces, and leaving other preselected areas uncovered,
   subjecting one or mroe of said workpieces to RF sputtering in a zone of reduced pressure in a range from about $10^{-3}$ to $10^{-1}$ torr in an inert gas atomosphere employing said workpiece as cathodes, and applying a differential potential between an anode and one or more of said cathodes sufficient to create a cold cathode glow discharge and causing the oxides of said uncovered, preselected areas to be sputtered away and transferred electrostatically to the surfaces of said anode, and to form cleaned surfaces in said preselected areas, without affecting the oxides over said selected areas covered by said mask,
   placing said workpieces in contact with each other in a stack without reoxidizing said cleaned surfaces,
   diffusion bonding said workpieces under heat and pressure at said preselected areas from which oxides were removed, without bonding said selected areas from which oxides were not removed,
   removing said mask during diffusion bonding, and
   superplastically forming at least one of said workpieces by applying fluid pressure within the unbonded area of said stack while said stack is within a temperature range at which said at least one workpiece exhibits superplastic characteristics.

* * * * *